United States Patent
Mamizuka

Patent Number: 6,061,144
Date of Patent: *May 9, 2000

[54] COLOR IMAGE FORMING APPARATUS HAVING FUNCTION FOR CORRECTING IMAGE DENSITY WHEN IMAGE DEVELOPMENT SYSTEM IS DETERIORATED

[75] Inventor: Mitsuru Mamizuka, Tokyo-to, Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/732,598

[22] Filed: Oct. 15, 1996

[30] Foreign Application Priority Data

Oct. 19, 1995 [JP] Japan ................................ 7-271430
Oct. 9, 1996 [JP] Japan ................................ 8-268501

[51] Int. Cl.[7] ........................................................ H04N 1/60
[52] U.S. Cl. ............................ 358/1.9; 358/519; 358/521
[58] Field of Search ............................ 358/500, 518–520, 358/521, 504, 1.9; 382/167, 274, 162; 395/109; H04N 1/60

[56] References Cited

U.S. PATENT DOCUMENTS

| | | | |
|---|---|---|---|
| 5,489,996 | 2/1996 | Oku et al. | 358/521 |
| 5,589,954 | 12/1996 | Watanabe | 358/521 |
| 5,594,558 | 1/1997 | Usami et al. | 358/520 |
| 5,710,871 | 1/1998 | Tadenuma et al. | 395/109 |

*Primary Examiner*—Kim Yen Vu
*Attorney, Agent, or Firm*—Oblon, Spivak, McClelland, Maier & Neustadt, P.C.

[57] ABSTRACT

A color copying apparatus includes a function for correcting image density when an image development system is deteriorated after a relatively long time of usage. A reference image including a number of color gray scales is stored in a memory, and is recorded on a recording medium. Each color gray scale corresponds to each of a yellow, a magenta, a cyan, and a black color for a letter image and each of a yellow, a magenta, a cyan, and a black color for a halftone image. When the image development system is deteriorated, the reference image recorded on the recording medium represents image density which is different from the reference image stored in the memory. This difference is detected by comparing the image density of two reference images, one stored in the memory and the other recorded on the recording medium. In accordance with a result of the comparison, a suitable data table of gamma data for each color element for a letter image and for each color element for a halftone image is selected from among a number of data tables of gamma data stored in the memory, so that the image density is corrected for each color element and for each image type and such that the image development system of the color copying apparatus is set again in a condition in which an image can be reproduced in a superior quality.

50 Claims, 7 Drawing Sheets

COLOR IMAGE FORMING APPARATUS HAVING FUNCTION FOR CORRECTING IMAGE DENSITY WHEN IMAGE DEVELOPMENT SYSTEM IS DETERIORATED

BACKGROUND OF THE INVENTION

1. Field of the Invention

This invention relates to a color image forming apparatus, and more particularly to a color image forming apparatus which includes a function for correcting image density when an image development system is deteriorated after a relatively long time of usage.

2. Discussion of the Background

In a background color image forming apparatus such as a digital color copying apparatus, an image development system is an absolutely important functional element that determines image quality of a duplicate from an original document. Among various components used in the image development system of the digital color copying apparatus, a photoconductive component, referred to as a photoconductor, is generally regarded as a key component for forming an electrostatic latent image on a surface thereof. A region of such an electrostatic latent image formed on the surface of the photoconductor has electrical potentials which differ from that of other regions of the surface of the photoconductor. Due to this difference of the electrical potentials, an electrical effect is caused such that color toner, such as, cyan (C), magenta (M), yellow (Y), and black (Bk) toner, are attracted to the region of the electrostatic latent image formed on a surface of the photoconductor. An image is accordingly visualized with the respective color toner in accordance with the electrostatic latent image, as a result.

A cycle of a copying operation conducted in the background digital color copying apparatus may be separated into three main operations, for the sake of simplicity: a reading operation in which an image of an original document is read and an image signal is generated; an image data processing operation in which image data receives various kinds of image data processing; and, a printing operation in which resultant image data is converted into a visualized image through the above-mentioned image development system onto recording paper. Among these three operations, the image data processing operation may be separated into three main functional operations: a first functional operation which is conducted right after the reading operation and which has a main function to make image signals representing a red (R), a green (G), and a blue (B) color image, respectively, on the basis of image signals output from the CCD (charge coupled device); a second functional operation which has a main function to make image signals representing a cyan (C), a magenta (M), a yellow (Y), and a black (Bk) color image, respectively, on the basis of the image signals representing the color images of R, G, and B, respectively; and, a third functional operation which is performed prior to the printing operation and which has a main function to make a signal on the basis of the image signals representing the color images of C, M, Y, and Bk, respectively, for driving an LD (laser diode) to reproduce a color image through the image development system. The above-mentioned image signals representing color images of C, M, Y, and Bk, respectively, correspond to color toner of C, M, Y, and Bk, respectively, and represent image density of these respective colors.

During the above-mentioned third functional operation, in particular, it is possible to adjust the image signals to reproduce the color image to a desired quality, or image density. Such adjustment of the image signals is achieved by multiplying data representing image density included in the image signals by a predetermined coefficient, and is commonly implemented in the background digital color copying apparatus. This multiplication is performed for every picture element of the color image for every color of C, M, Y, and Bk. Generally, a set of predetermined coefficients is provided to establish a relationship of image density between a color image of an original document, to be referred to as input data, and a color image of a duplicate from the original document, to be referred to as output data. This relationship known per se is often referred to as a gamma, and the above-mentioned set of predetermined coefficients is referred to as a gamma table.

When contents of a gamma table are expressed in a graph of X- and Y-coordinates, a relationship is shown of image density between the read image (X-coordinate) as input data and an image of the duplicate (Y-coordinate) as output data. If every point represented by the X- and Y-coordinates is linked in this graph, a plotted line is shown which may be referred to as a gamma line. A variety of line forms are ideally created for a gamma line, such as, a straight line and an S-shaped line. In addition, these lines can have various different angles of elevation to change a relationship between input and output image density so as to match various different situations of the image development system.

After having being used for a relatively long time, a color copying apparatus will usually begin to have a kind of machine fatigue on various components used therein. In such circumstances, a photoconductor particularly is a critical component since such machine fatigue causes deterioration on photosensitivity of the photoconductor with which an electrostatic latent image is created. As an inevitable result, a user sees a reproduced image in degraded quality and faces difficulties in obtaining a reproduced image of a desired quality on the color copying apparatus. Once the color copying apparatus is turned into the situation as mentioned-above, the user will be required to adjust the quality of the image, for example, by manipulating a key on an operation panel and so forth, in accordance with a predetermined manner, which is referred to as a manual adjustment.

The user can try several adjustable items, such as, for example, a level of image density in each color, contrast of light and dark in each color, and so forth. However, these efforts by the user will normally be in vain, since the user usually has little reference or experience of handling a color image. When halftone colors are taken into account, a number of possible color combinations in a color image becomes enormous, and it often becomes difficult for a user to determine which setting of color combination and halftone colors is the best in image quality. Therefore, the above-mentioned adjustments are only time-consuming for an average user. As a result, the user will eventually have to ask for a service technician from outside to adjust the color copying apparatus.

The above-mentioned issue has been addressed in a proposal disclosed in the official gazette for Laid Japanese Patent Application TOKUKOU HEI 6-69210.

This proposal describes a function of changing a gamma table to be performed to solve a problem of degraded image quality by deterioration of the image development system after a relatively long time of usage. To solve the problem, the proposed solution provides the background color copying apparatus with a plural number of gamma tables so that gamma tables operative as an initial setting of the background color copying apparatus can be changed to other gamma tables in accordance with deterioration of the image development system. More specifically, there are provided in total four gamma grades for each color of R, G, and B. A red (R) color, for example, is provided with four gamma grades from a first gamma grade of an initial gamma table to a fourth gamma grade of another gamma table. By thus arranging the gamma grades, a gamma table change for one color can be performed independently from a gamma table change for the other colors.

As an initial setting of the background color copying apparatus, each color is set at the first grade. When the background color copying apparatus begins to reproduce a degraded duplicate image from an original document, the gamma grade may be changed. Through the gamma function, the first gamma grade for each color of R, G, and B may be changed to a second gamma grade, depending upon how far a color of the image is degraded. This change can be performed until the fourth gamma grade is used for each color of R, G, and B. Thus, the user can change a gamma table for each color on the background color copying apparatus so as to set the image development system in a condition in which a color image can be reproduced to a desired quality.

This proposal further describes an appearance of a degraded duplicate image caused from a deterioration on a photoconductor, and also describes a procedure of detecting such deterioration. When the photoconductor becomes deteriorated, its photosensitivity usually becomes weakened and image density of a reproduced image accordingly becomes relatively lowered throughout a whole surface of a duplicate from an original document. In this situation, a difference of image density between one arbitrary portion of a relatively high image density in the duplicate image and the other arbitrary portion of a relatively low image density in the duplicate image will become relatively small. Therefore, this problematic situation can be detected by checking whether or not a difference of image density between two portions in the duplicate image is smaller than a predetermined value.

The proposal teaches, as a whole, a procedure of correcting the lowered image density, steps of which procedure are mentioned below. A background color copying apparatus is provided with a test mode in which correction of lowered image density is to be executed. A test sheet having an image representing three color gray scales to be read in the test mode is also provided. Each one of these three color gray scale images corresponds to one of the colors of R, G, and B, and includes four image blocks representing the respective color gray scale.

After steps of reading the test sheet and printing an image in accordance with the read image formed on the test sheet in the test mode, the printed image is subjected to measurement of image density. What is actually measured in this measurement step is a difference of image density in each color of R, G, and B between image blocks adjacent to each other. It is then checked whether or not this difference is smaller than a predetermined value. When this difference is detected to be smaller than the predetermined value, it is determined that the deterioration on the image development system is so progressed that the present gamma tables can no longer be appropriately used. In this case, it is further determined to switch the present gamma tables to the next grade so that an image can be reproduced at a desired quality as was reproduced previously. A gamma table is switched unless the present gamma table is in the last grade available. With the gamma table in such an advanced grade, an angle of elevation for the gamma line becomes greater than that of the previous gamma line. By thus applying a relatively great angle of elevation of the gamma line, the background color copying apparatus can set the image development system in a condition in which image density relatively higher than that in the previous condition can be set throughout its range from a null level to a darkest level.

However, there are problems observed at a user site in using the background color copying apparatus including the above-mentioned proposed solution. From a user viewpoint, one of the problems is present in a way such that a gamma table change is automatically executed once the user instructs execution of the gamma table change on the background color copying apparatus for whatever reasons. The reason may or may not be a deterioration of the photoconductor, which is reasonable to execute the gamma table change. However, the reason may often be that the test sheet is dirty, the photoconductor is dirty, or the like, as examples, in which case it is obviously not reasonable to execute the gamma table change. What is worse in this case is that there is no way for the user to cancel the executed gamma table change and to return to the previous condition in which the user can use the previous gamma table.

Moreover, even if the photoconductor has deteriorated and it is the right time to execute the gamma table change, it is rarely possible that the background color copying apparatus changes a gamma table so as to reproduce a color at a desired quality as was previously made, by using the gamma table change function. This is because the function of the gamma table change according to the above-mentioned proposed solution only detects the image density which is lowered, but not how far the image density is lowered from the image density which was set when an image was reproduced in superior quality. In other words, a gamma table provided in the next gamma grade can rarely be a gamma table which was set when an image was reproduced in superior quality. It is therefore obvious that the background color copying apparatus having a function of a gamma table change according to the proposed solution is not capable of properly correcting image density when an image development system is deteriorated after a relatively long time of usage.

SUMMARY OF THE INVENTION

It is, accordingly, an object of the present invention to provide a novel color copying apparatus including a function for properly correcting image density when an image development system is deteriorated after a relatively long time of usage.

It is another object of the present invention to provide a novel color image forming apparatus including an image density correction function having a procedure of a gamma table change with which a color image is reproduced in superior quality as was previously made.

It is another object of the present invention to provide a novel color copying apparatus including an image density correction function having a procedure for canceling execution of a gamma table change.

It is another object of the present invention to provide a novel color copying apparatus including an image density correction function having a procedure for making a previous gamma table effective.

In accomplishing these and other objects, there has been provided, in accordance with the present invention, an improved color copying apparatus including an original document reading unit, an image signal processing circuit, an image recording unit, a memory for storing data of a gamma table, an operation panel, and a control circuit for controlling a gamma table change.

The color copying apparatus is provided with an image density correction mode in which a gamma table is changed, so that the mode is henceforth referred to as a gamma table change mode. An operator can change a system mode of the color copying apparatus to the gamma table change mode, for example, by pressing a corresponding key on an operation panel.

In a memory for storing data of a gamma table, data for representing a reference ID (image density) test chart is also stored. The reference ID test chart includes, for example, eight horizontally oblong rectangles of a same gradation image, aligned vertically. Each one of these rectangles is vertically separated into, for example, eight blocks having eight different fill patterns so as to form in total a gray scale of eight stepwise levels of image density. The gray scale thus formed may be referred to as a reference gray scale. A first group of four horizontally oblong rectangles is assigned for an image representing letters referred to as a letter image, and each horizontally oblong rectangle is arranged to be printed in a color, for example, a yellow (Y), a magenta (M), a cyan (C), or a black (Bk) color, respectively. A second group of four horizontally oblong rectangles is assigned for an image representing photos referred to as a photo image, and each horizontally oblong rectangle is arranged to be printed in a color, for example, Y, M, C, or Bk, respectively.

When the operator instructs to print the reference ID test chart stored in the memory, for example, by pressing a corresponding key on the operation panel in the gamma table change mode, the reference ID test chart is printed. After that, at the discretion of the operator, a function of the gamma table change can be continued by actions of the operator, picking up the printed reference ID test chart, placing it at a proper reading position in the color copying apparatus, and, for example, pressing a corresponding key on an operation panel for starting a reading operation. In a case of discontinuation, the operator just omits the above-mentioned actions, and the function of the gamma table change is then discontinued.

In addition to a number of gamma tables stored in the memory, each representing a straight line as a form of a line of a gamma line, there are also stored in the memory a number of gamma tables each representing an S-shaped line as another form of a line of a gamma line. These two types of gamma lines each having a different form of a line are referred to as a straight gamma line and an S-shaped gamma line, respectively. Each of these gamma lines including the straight gamma lines and the S-shaped gamma lines represent lines of different angles of elevation. By thus arranging the gamma tables representing a variety of the gamma lines, it becomes possible to respond properly to many different cases of deterioration of image quality.

When an operator starts the reading operation as mentioned above, the original document reading unit reads the gray scale of the reference ID test chart recorded on paper. After that, the control circuit for controlling the gamma table change analyzes deterioration of image quality by comparing the read gray scale of the reference ID test chart recorded on paper and the reference gray scale of the reference ID test chart stored in the memory. This comparison is conducted for every color of C, M, Y, and Bk for both letter images and photo images. A difference detected by this comparison represents how far the image density of the reference ID test chart recorded on paper is differed upwards or downwards from the image density of the reference ID test chart stored in the memory.

The controller circuit for controlling the gamma table change then selects a gamma table filling the above-mentioned difference of image density from among a number of gamma tables representing both straight and S-shaped gamma lines. Accordingly, the controller circuit for controlling the gamma table change switches the gamma table to the most suitable gamma table to properly correct image density so as to reproduce a color image of superior quality. Thus, the user can easily correct image density of a duplicate color image from an original document when the color copying apparatus is deteriorated after a relatively long time of usage.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, in which.

DESCRIPTION OF THE PREFERRED EMBODIMENTS

Figure 1:
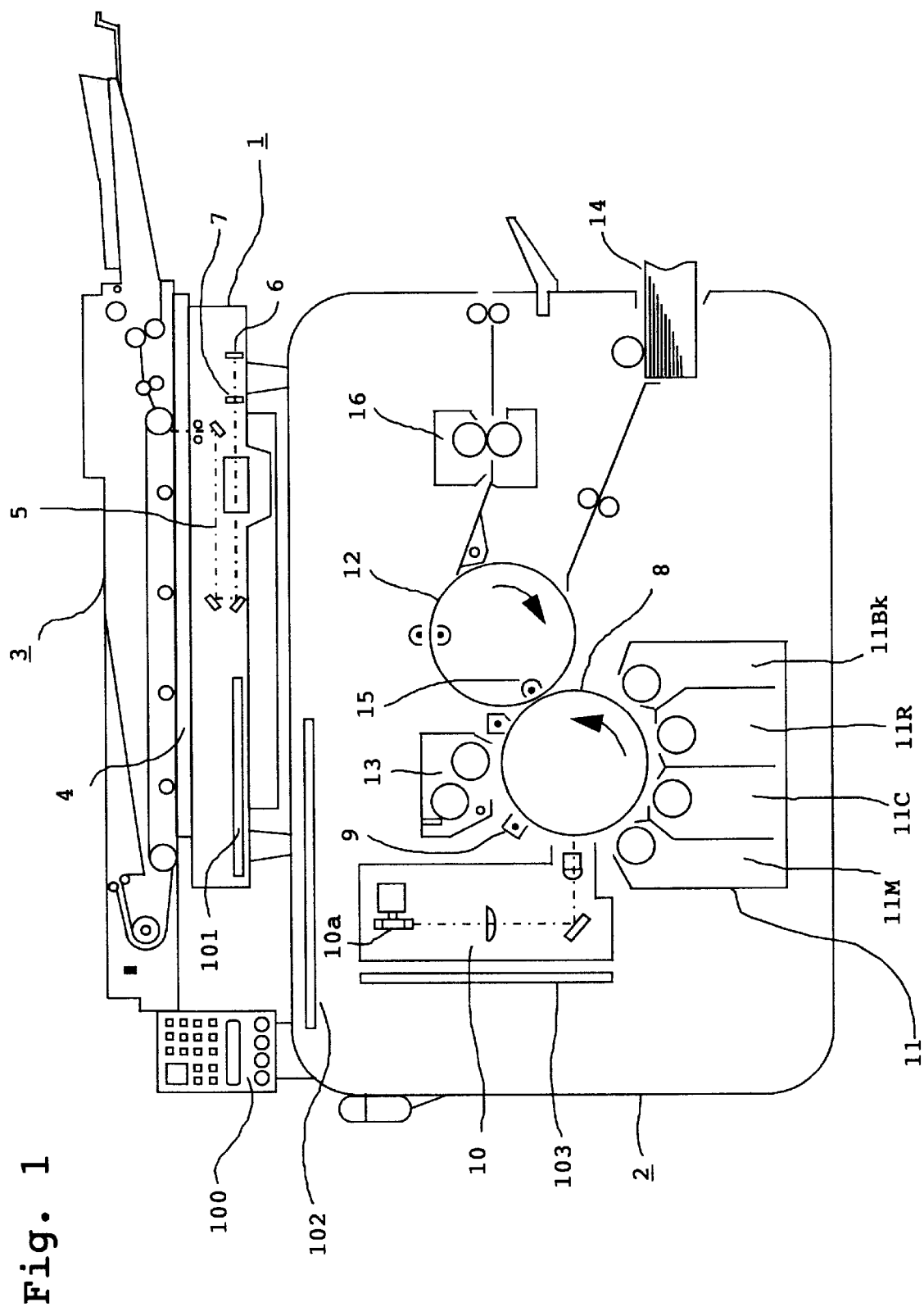
FIG. 1 is a schematic diagram for showing a color copying apparatus as an exemplary embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a color copying apparatus including a scanner 1, a laser printer 2, an ADF (automatic document feeder) 3, an operation panel 100, and so forth.

The scanner 1 is operative in an image reading operation of the color copying apparatus and includes a contact glass 4, an optical scanning and exposing device 5, a three-line CCD (charge coupled device) 6 having three photosensing elements, and a scan data control circuit 101. The optical scanning and exposing device 5 of the scanner 1 radiates light towards a surface of an original document placed on the contact glass 4 and moves stepwise in the direction from the right to the left of FIG. 1 within a frame of the scanner 1. Light is reflected by the surface of the original document and falls on the CCD 6 so that an image from the original document is formed on the CCD 6. A part of an image is thus read. Accordingly, when moving stepwise in the direction from one end to the other end in the scanner 1 in FIG. 1, the optical scanning and exposing device 5 can read a whole image of an original document.

In more detail, the light reflected from the original document enters into the optical scanning and exposing device 5, and, through several steps, such as, being reflected by a mirror, passing through a lens, and so forth, impinges on an infrared ray filter 7 for cutting off only light having a wavelength longer than that of visible light. The light then falls on the three-line CCD 6, each photosensing element of which corresponds to one of colors of red, green, and blue. Henceforth, these three colors of red, green and blue are abbreviated as R, G, and B, respectively. By the three-line CCD 6, the light is converted into three electric image signals representing colors of R, G, and B, respectively.

When the scanner 1 is operative in the image reading operation, an image of an original document is read in two directions: one direction perpendicular to the surface of FIG. 1 is referred to as a main scanning direction; the other direction from the right to the left of FIG. 1 is referred to as a sub-scanning direction.

The laser printer 2 is configured in accordance with an electrophotography method known per se and includes parts, such as, a drum-like photoconductor 8, a charger 9, a writing unit 10, a development unit 11, a transfer drum 12, a cleaning unit 13, a print data control circuit 103, and so forth. An arrangement of these parts is such that the drum-like photoconductor 8 is positioned at the center among other parts, and these other parts are positioned around the perimeter of the photoconductor 8. A region of the surface of the photoconductor 8 in the laser printer 2 may be defined by two directions corresponding to those defined in the scanner 1; a main scanning direction which is in parallel with the rotation axis of the photoconductor 8 and a sub-scanning direction which is in a transverse direction to the movement of the surface of the photoconductor 8.

The laser writing unit 10 controls a laser beam from a light source such as a laser diode to write an image on the surface of the photoconductor 8. The laser beam generated from the laser diode is continuously reflected by a rotary polygon mirror 10a and is controlled to scan the surface of the photoconductor 8 in the main scanning direction so as to form thereon an electrostatic latent image as a copied image from the image of the original document. The development unit 11 includes toner kits 11M, 11C, 11Y, and 11Bk, respectively containing color toner of magenta (M), cyan (C), yellow (Y), and black (Bk). Henceforth, these four colors of magenta, cyan, yellow and black are abbreviated as M, C, Y, and Bk, respectively. This development unit 11 rotates four times to complete one cycle of an image development operation, and in each rotation a visible image is formed in one of the color toners of M, C, Y, and Bk on the basis of the electrostatic latent image.

The transfer drum 12 includes a transfer charger 15 having an axis in parallel with the rotation axis of the photoconductor 8. The transfer drum 12 receives paper 14 which is fed, and rotates while holding the paper 14. By rotating four times in synchronism with the rotation of the photoconductor 8, the transfer drum 12 completes one cycle of the operation of transferring an image from the photoconductor 8 to the paper sheet 14. In each rotation of the transfer drum 12, the transfer charger 15 of the transfer drum 12 activates to transfer an image made of one color type of color toner of M, C, Y, and Bk from the surface of the photoconductor 8 to the surface of the paper 14. The transferred image is thereby formed in a form sequentially overlaid by four images, each developed in one of the color toners of M, C, Y, and Bk on the surface of the paper 14 held by the transfer drum 12. The paper sheet 14 held by the transfer drum 12 is released therefrom when one cycle of the image transferring operation is completed, and is then guided to a fixing unit 16 for fixing toner on the paper 14. Through the fixing unit 16, the paper 14 is firmly fixed with a color image in accordance with the image of the original document, and is then ejected out of the digital color copying apparatus.

Next, operations of main portions of the color copying apparatus, such as, the scan data control circuit 101 of the scanner 1, an image signal processing circuit 102, and the print data control circuit 103 of the laser printer 2, are explained with reference to FIG. 2.

Figure 2:
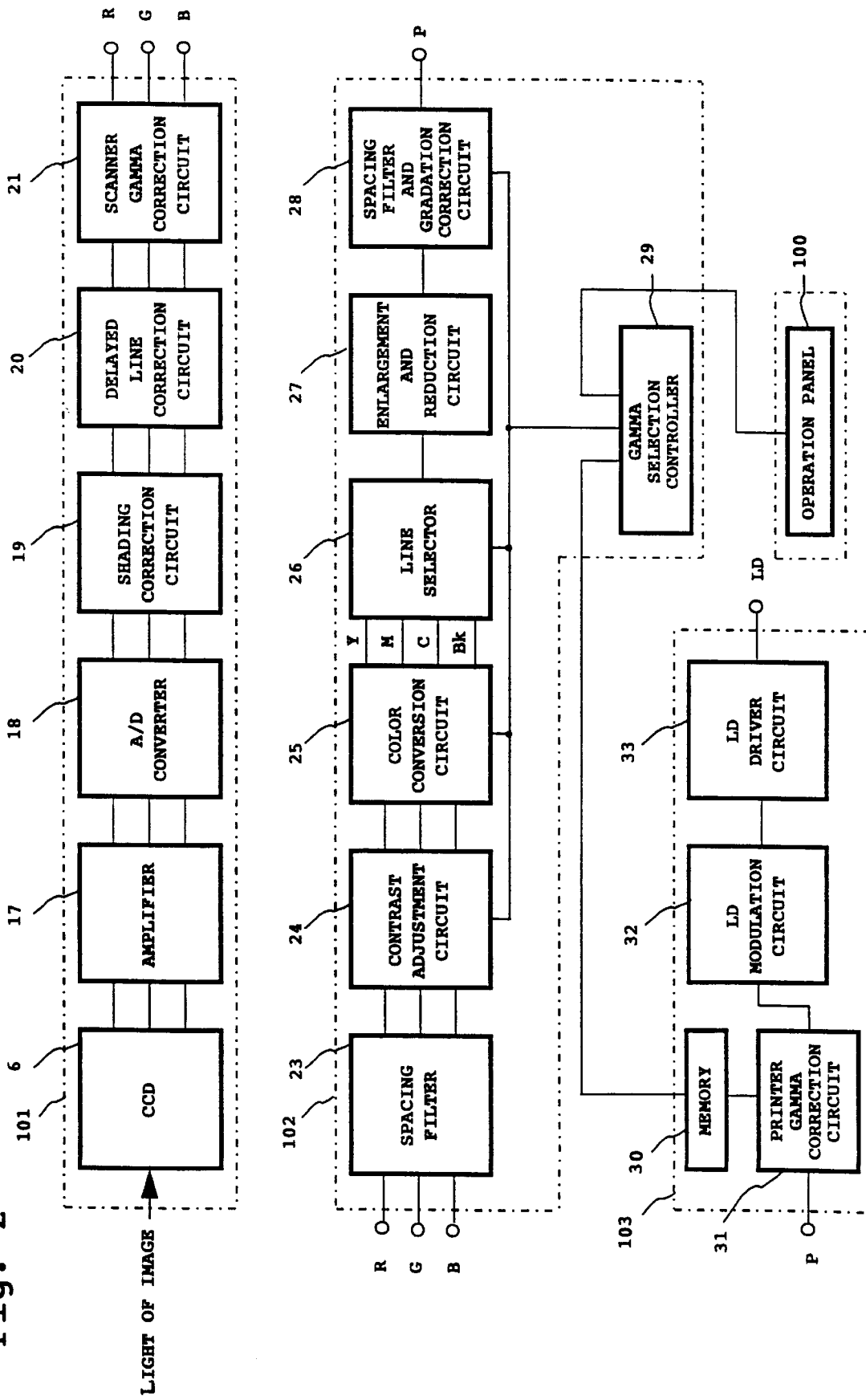
FIG. 2 is a block diagram of a scan data control circuit, an image signal processing circuit, a print data control circuit and so forth, for showing a flow of an image signal.

Referring to the scan data control circuit 101 of the scanner 1 shown in FIG. 2, the three-line CCD 6 generates three analog electric signals in accordance with an image of an original document being read, representing colors of R, G, and B, respectively. These analog signals are conducted to an amplifier 17 and are amplified to an applicable level as input signals to an A/D (analog to digital) converter 18. The A/D converter 18 converts these three analog signals into three digital signals, respectively, each signal representing a digital value having, for example, an eight data bit configuration.

A shading correction circuit 19 corrects an uneven light amount in the main scanning direction, which light is radiated by the light source, and also corrects an uneven sensitivity of each photosensing element of the three-line CCD 6. A delayed line correction circuit 20 corrects time lags among the three signals of R, G, and B from the three-line CCD 6, which time lags are caused from physical distances present among these three signal lines in the CCD 6.

A scanner gamma correction circuit 21 performs a gamma correction to data of the above-mentioned three signals, and also performs correction of the data of the three signals by changing a linear function from one for a reflecting ratio to another for brightness. The scanner gamma correction circuit 21 also corrects spacing between picture elements of the image when the size of the image is enlarged or reduced.

Next, referring to the image signal processing circuit 102 in FIG. 2, a spacing filter 23 processes these R, G, and B signals by smoothing a halftone image thereof and sharpening a letter image thereof. A contrast adjustment circuit 24 adjusts a degree of contrast of light and dark depending upon a type of an image to be processed. A color conversion circuit 25 converts the three color signals of R, G, and B into four color signals of Y, M, C, and Bk, and also executes color correction on these colors of Y, M, C, and Bk. A line selector 26 selects one of the color signals of Y, M, C, and Bk in accordance with a sequence of four times of the image forming and transferring process in the laser printer 2.

Enlargement and reduction circuit 27 varies the size of an image in the main scanning direction upon an instruction of enlargement or reduction, while enlargement and reduction in the sub-scanning direction is performed by the scanner 1 with varying its sub-scanning speed in the sub-scanning direction. Spacing filter and gradation correction circuit 28 further corrects the image by applying selective coefficients suitable for the image smoothed and sharpened by the spacing filter 23, and also corrects the halftone image since the spacing filter 23 includes an effect of halftone correction.

A gamma selection controller 29 controls an operation of selecting an appropriate gamma table upon detecting a gamma table change instruction from an operator through the operation panel 100.

Next, referring to the print data control circuit 103 of the laser printer 2 in FIG. 2, a memory 30 stores data of the reference ID test chart, and data of a number of gamma tables representing various gamma lines in a straight line form with various angles of elevation and in an S-shape line form with various angles of elevation. A printer gamma correction circuit 31 receives the color image signal and a printer signal P output from the spacing filter and gradation correction circuits 28 as shown in FIG. 2.

Selection of gamma tables can be made either in an automatic mode or a manual mode. However, the manual mode is, as aforementioned in the section of the background discussion, generally provided to the background color copying apparatuses, and does not satisfy the user needs. This manual mode is therefore not explained further. The color copying apparatus having the automatic mode is an example embodying the present invention, and, therefore, its detail is henceforth described.

An output from the printer gamma correction circuit 31 is processed through an LD (laser diode) modulation circuit 32 and an LD (laser diode) driver circuit 33, and is then applied to an LD (laser diode) in the laser writing unit 10 so as to write an electrostatic latent image on the surface of the photoconductor 8 of the laser printer 2 as described above with referring to FIG. 1.

Figure 3:
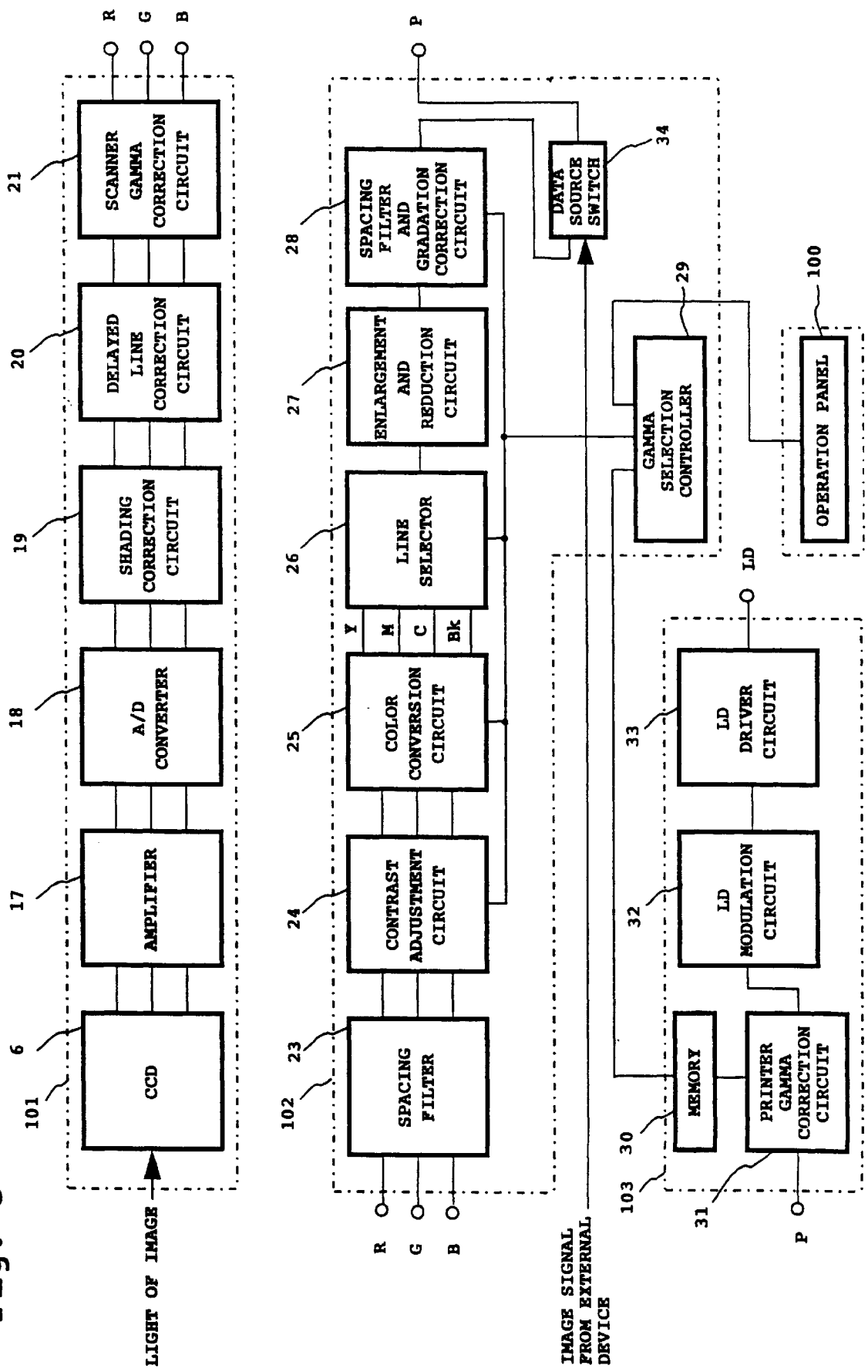
FIG. 3 is a block diagram of a scan data control circuit, a modified image signal processing unit, a print data control circuit and so forth, for showing another flow of an image signal.

For a case that this color copying apparatus includes a connection to an external device such as a personal computer (not shown), a modified embodiment of the image signal processing circuit 102 in FIG. 2 is provided as shown in FIG. 3. The configuration of FIG. 3 is similar to that of FIG. 2, except an additional circuit of a data source switch 34 is provided in FIG. 3. An image signal read by the scanner and an image signal created by a personal computer, as an example, include different characteristic of image density, and therefore require different gamma correction lines. Accordingly, in addition to a set of a number of gamma tables for the image signals read by the scanner 2, another set of a number of gamma tables designated for the image signal from the external personal computer is required to be stored in the memory 30. The data source switch 34 normally selects an image signal from the spacing filter and gradation correction circuit 28. However, when receiving an image signal from an external device, the data source selector 34 switches from the image signal from the spacing filter and gradation correction circuits 28 to an image signal from an external device. The selected signal is accordingly applied to the printer gamma correction circuit 31. At this time, since the gamma selection controller 29 detects the signal from the external device, the gamma selection controller 29 selects a gamma table suitable for the image signal from the external device. The image signal is then corrected by using this gamma table. Thus, the gamma correction can selectively be operative for a copying operation or for the case that the color copying apparatus is connected with an external device such as a personal computer.

Figure 4:
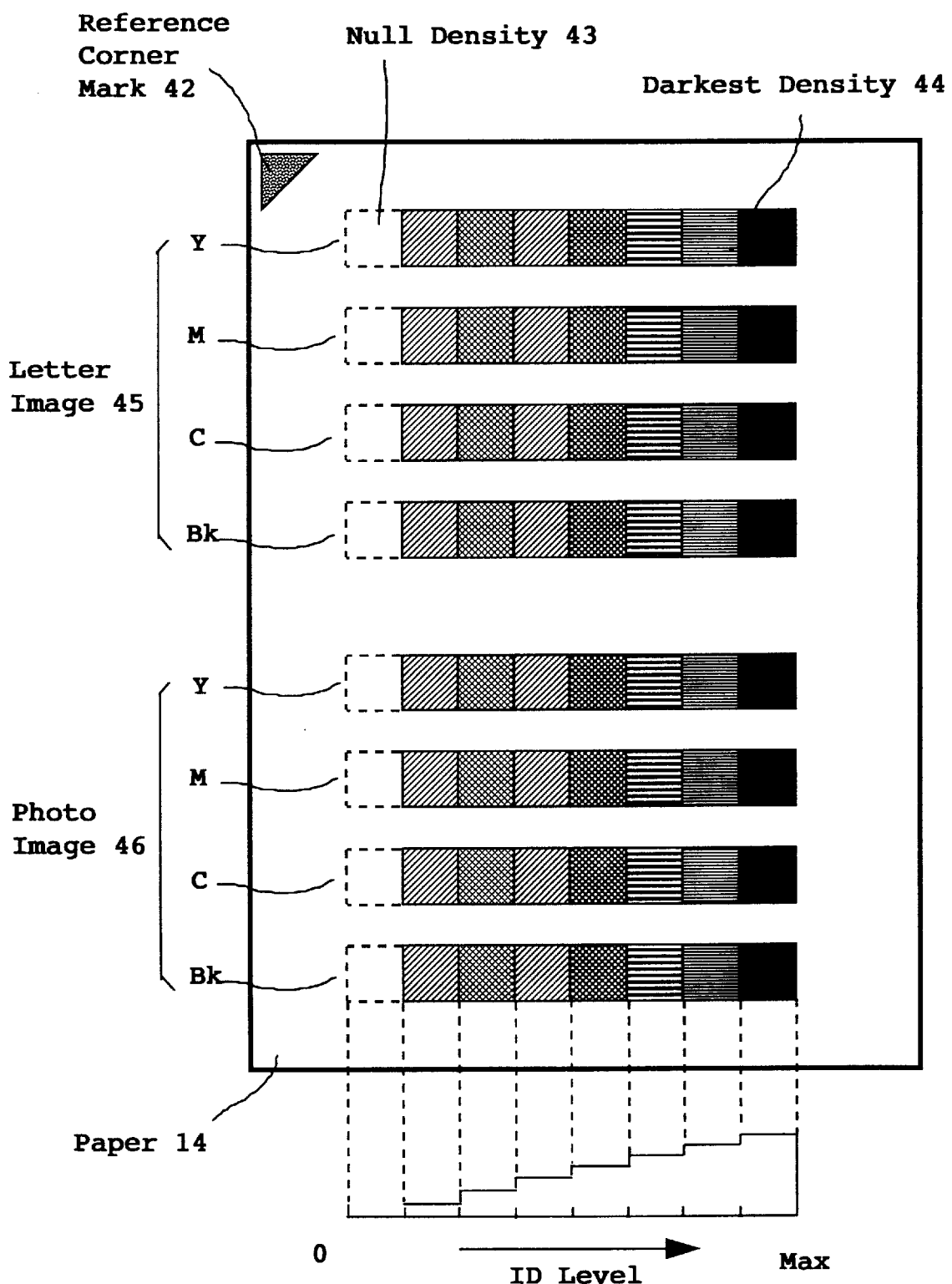
FIG. 4 is an illustration showing a reference ID (image data) test chart recorded on paper, which chart includes reference gray scales and a reference corner mark and is stored in a memory of the color copying apparatus.

Next, a reference ID test chart is explained with reference to FIG. 4. As mentioned above, the memory 30 in FIG. 2 stores data representing the reference ID test chart recorded on paper 14. The reference ID test chart includes, for example, eight horizontally oblong rectangles of a same gradation image, aligned vertically, as shown in FIG. 4. Each one of these rectangles is vertically separated into, for example, eight blocks having eight different fill patterns so as to form in total a gray scale of eight stepwise levels of image density. Among the eight blocks, the lowest image density is a null density 43, and the highest density is a darkest density 44. The gray scale thus formed may be referred to as a reference gray scale. A first group of four horizontally oblong rectangles is assigned for a letter image 45, and each horizontally oblong rectangle is arranged to be printed, for example, in a yellow (Y), a magenta (M), a cyan (C), or a black (Bk) color, respectively. A second group of four horizontally oblong rectangles is assigned for a photo image 46, and each horizontally oblong rectangle is arranged to be printed, for example, in a color of Y, M, C, or Bk, respectively. In addition, a reference corner mark 42 is provided in the reference ID test chart, for confirming that the reference ID test chart recorded on paper 14 is in an appropriate position when being read.

Figure 5:
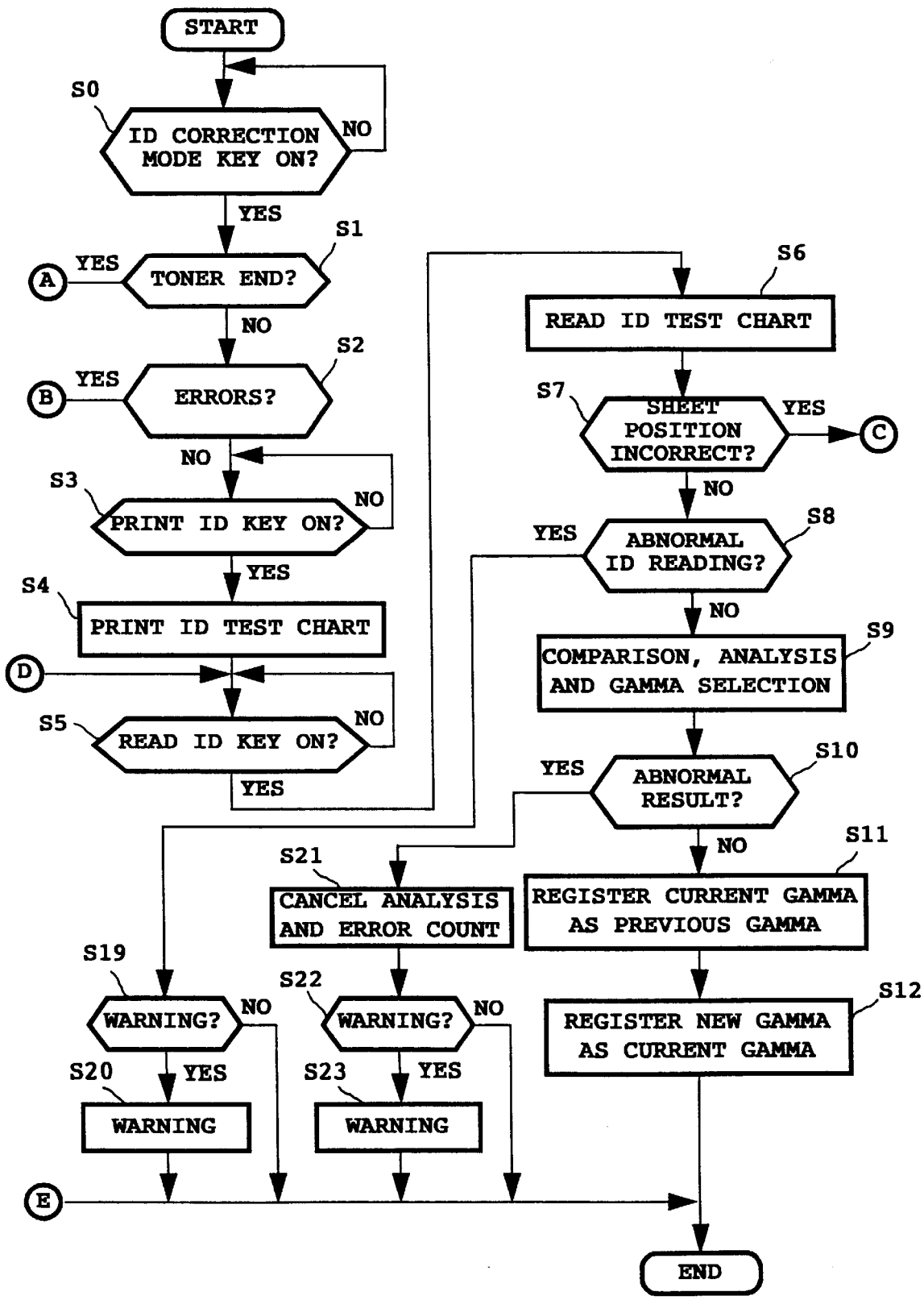
FIGS. 5 and 6 are flowcharts representing a process of how a gamma table is changed by the image signal processing circuit shown in FIG. 2.
Figure 6:
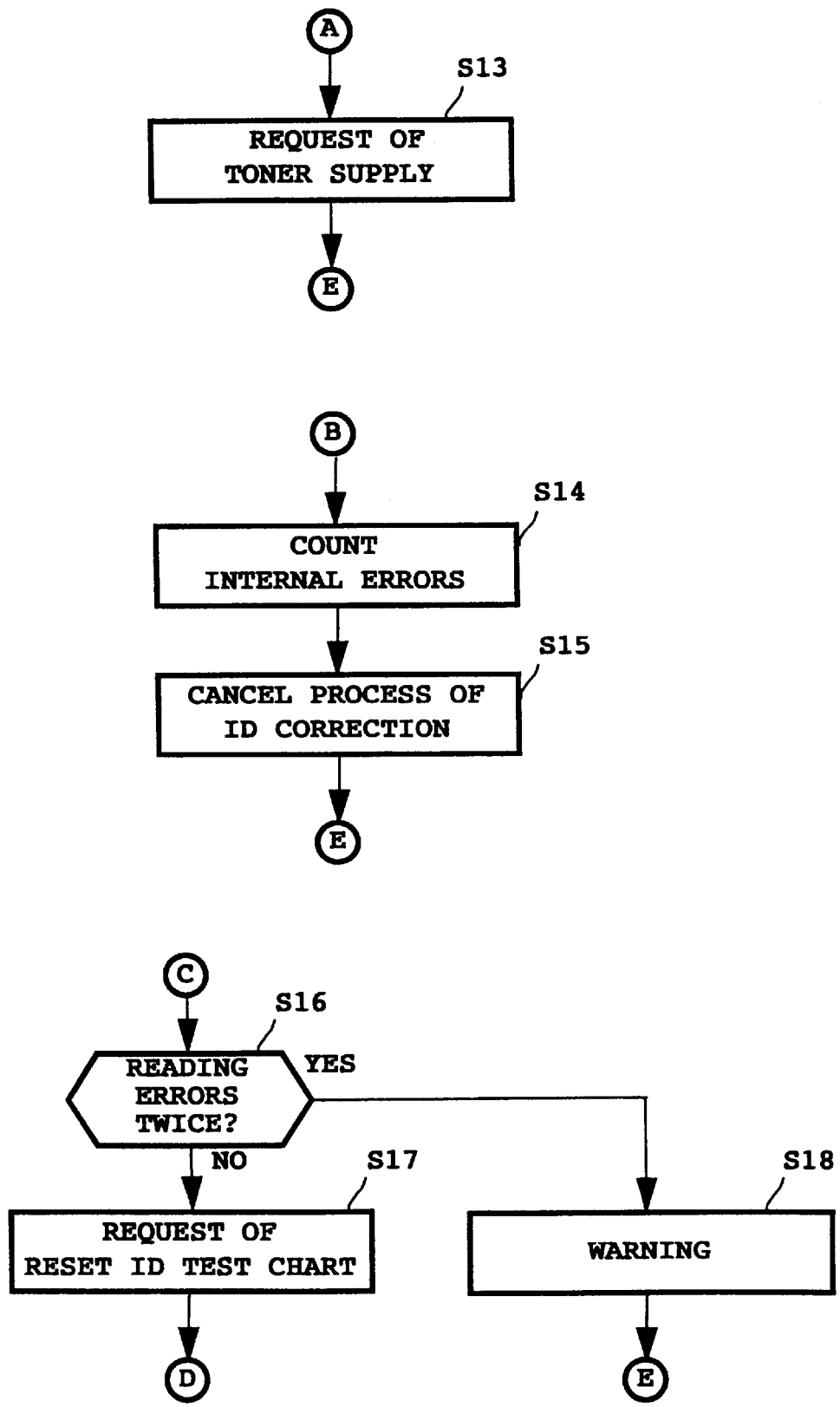

Next, a procedure of a gamma table change is explained with reference to FIGS. 5 and 6. The procedure starts when the gamma selection controller 29 detects pressing of a gamma table change mode key on the operation panel 100 for entering into a mode for changing the gamma table. Upon a detection of the press of the gamma table change mode, the gamma selection controller 29 checks in Step Si whether or not the development unit 11 is in a toner end state. If YES in Step S1, the gamma selection controller 29, in Step S13, instructs the operation panel 100 to provide a request for exchanging a toner kit. When the toner end state is terminated, the process proceeds to Step S2 in which the gamma selection controller 29 checks whether any internal error has occurred, but if the toner end state is not terminated, the process is then ended. If YES in Step S2, a number of occurrences of internal errors are counted in Step S14. After further execution of the processing is canceled in Step S15, the process is ended.

If NO in Step S2, the gamma selection controller 29 checks in Step S3 whether or not a print ID key on the operation panel 100 has been pressed for starting a print of the reference ID test chart shown in FIG. 4. Upon detecting that the print ID key is pressed, the gamma selection controller 29 instructs to print the reference ID test chart on the paper 14, in Step S4. The process then proceeds to Step S5 in which the gamma selection controller 29 checks whether or not a read ID key on the operation panel 100 has been pressed for starting a read of the recorded reference ID test chart. Upon detecting that the read ID key is pressed, the gamma selection controller 29 instructs to read the reference ID test chart recorded on the paper 14 in Step S6. The process further proceeds to Step S7 in which the gamma selection controller 29 checks whether or not the corner mark 42 is positioned at a predetermined position so as to check if the paper 14 including the reference ID test chart recorded thereon is properly positioned.

If YES in Step S7, meaning the paper 14 including the reference ID test chart recorded thereon is not properly positioned, the gamma selection controller 29 checks whether or not the paper 14 including the reference ID test chart recorded thereon is detected in an improper position for two successive times in Step S16. If NO in step S16, which means that the paper 14 including the reference ID test chart recorded thereon is detected in an improper position only once, the gamma selection controller 29, in Step S17, instructs the operation panel 100 to provide a request for resetting the paper 14 including the reference ID test chart recorded thereon. The process is then returned to Step S5 in which the gamma selection controller 29 waits for a detection of another press of the read ID key. If YES in Step S16, meaning that the paper 14 including the reference ID test chart recorded thereon is detected in an improper position for two successive times, the gamma selection controller 29, in Step S18, instructs the operation panel 100 to provide a warning for telling that the paper 14 including the reference ID test chart recorded thereon is detected in an abnormal position. The process is then ended.

If No in Step S7, this means that the paper 14 including the reference ID test chart recorded thereon is set in a proper position. The process then proceeds to Step S8, in which the gamma selection controller 29 checks whether or not a reading of the gray scale of the reference ID test chart recorded on the paper 14 is similar to a reading of the reference gray scale of the reference ID test chart stored in the memory 30. If YES in Step S8, this means that the reading of the gray scale of the reference ID test chart recorded on the paper 14 is not similar to the reading of the reference gray scale of the reference ID test chart stored in the memory 30. In Step S19, the gamma selection controller 29 accordingly instructs the operation panel 100 to provide a warning for indicating occurrence of an abnormal image density reading in Step S20. The process is then ended.

If NO in Step S8, this means that the read data of the gray scale of the reference ID test chart recorded on the paper 14 is in accordance with data of the reference gray scale of the reference ID test chart stored in the memory 30. In this case, the process proceeds to Step S9. In Step S9, the gamma selection controller 29 analyzes values of the read image density represented in each small block of the gradation image for each color of Y, M, C, and Bk for the letter image 45 and for each color of Y, M, C, and Bk for the halftone image 46. The gamma selection controller 29 then checks whether or not any one of the analyzed values is out of predetermined limits in Step S10. If NO in step S10, which means that the analyzed values are within the predetermined limits, the gamma selection controller 29 registers the gamma table used currently as the previous gamma table, in Step S11.

Then, the gamma selection controller 29 selects a most suitable gamma table from among a number of gamma tables in the way as explained hereinbefore, and registers the selected gamma table as the current gamma table in Step S12. The process is then ended. In an event that any one of the analyzed values exceeds the predetermined limit in Step S10, the gamma selection controller 29 determines that an abnormal error occurs, and, before finishing the process, immediately takes actions of aborting a checking which detected the abnormal error and executing remaining checking, in Step S21. At the same time, the gamma selection controller 29 increments an abnormal error counter as a record, in Step S21. In Step S22, the gamma selection controller 29 accordingly instructs the operation panel 100 to provide a warning for indicating occurrence of an abnormal image density reading in Step S23. The process is then ended.

Next, a procedure of how a suitable gamma table is selected is explained in detail. By using the reference gray scale stored in the memory of the color copying apparatus according to the present invention, there are provided eight step gray scales of a degree of image density to the gamma selection controller 29 as reference degrees of image density. One of these eight step gray scales is considered as an example, namely Scale A, for the sake of simplicity. In a graph of X- and Y-coordinates, wherein the X-coordinate is an input and the Y-coordinate is an output, Scale A is expressed as input data, $X_1$. When a coefficient, namely $C_1$, with which input data is converted into output data is provided, multiplying input degree $X_1$ of image density with coefficient $C_1$ creates output degree $Y_1$ of image density, which is expressed by the following equation.

$$C_1 = \frac{Y_1}{X_1} \tag{1}$$

This coefficient expressed by the equation (1) is regarded as gamma data of a gamma table, and coefficient $C_1$ is expressed by $X_1$ and $Y_1$ in the above-mentioned graph. The output degree $Y_1$ of image density is a value set as an initial value with which an image is reproduced in superior quality. If a degree of image density of an output is changed over deterioration and becomes degree $Y_2$ of image density, a difference between $Y_1$ and $Y_2$ means a degree of deterioration on image density. If this difference is expressed as $Y_{det}$, a relationship among $Y_1$, $Y_2$, and $Y_{det}$ is expressed by the following equation.

$$Y_2 = Y_1 - Y_{det} \tag{2}$$

Accordingly, coefficient $C_1$ is expressed by the following equation.

$$C_1 = \frac{Y_2}{X_1} = \frac{Y_1 - Y_{det}}{X_1} \neq \frac{Y_1}{X_1} \tag{3}$$

To create an output of image density equal to output $Y_1$ of image density with difference $Y_{det}$ over the deterioration taken into account, another coefficient which is different from coefficient $C_1$ is required, namely coefficient $C_2$. In this case, coefficient $C_2$ converts input $X_1$ into output $Y_3$ and output $Y_3$ is subtracted by difference $Y_{det}$. In this case, a relationship among output $Y_1$, output $Y_2$, output $Y_3$, and difference $Y_{det}$ of image density is expressed by the following equation.

$$Y_3 = Y_1 + Y_{det} \tag{4}$$

The new coefficient, $C_2$, on the basis of the above-mentioned relationship is expressed by the following equation.

$$C_2 = \frac{Y_3}{X_1} = \frac{Y_1 + Y_{det}}{X_1} \tag{5}$$

When this coefficient $C_2$ is used as new gamma data, a substantial output degree of image density becomes output degree $Y_1$ of image density since an output degree $Y_3$ of image density is subtracted by difference $Y_{det}$.

One sample of gamma data of a gamma table to be selected to correct image density under deterioration is thus found in the above-mentioned procedure. Then, a gamma table having closest data to the above-mentioned sample of gamma data, with which input $X_1$ is converted into output $Y_3$, is searched for from among all the gamma table stored in the memory. This searching operation is conducted through eight different degrees of image density on the basis of the eight reference gray scales. A gamma line of a gamma table having closest data in total in these eight different degrees of image density is thus designated as a new gamma table. In addition, this operation may be conducted for each color element of C, M, Y, and Bk, for a letter image, and for each color element of C, M, Y, and Bk for a photo image to search for a new gamma table for each color element of C, M, Y, and Bk, for a letter image, and for each color element of C, M, Y, and Bk for a photo image.

Even after a new gamma table is selected in place of the previous gamma table, the operator can cancel execution of changing a gamma table by pressing a corresponding key on the operation panel 100.

An operator can set a warning to be either effective or ineffective through the operator panel 100, which warning becomes operative when the gamma selection controller 29 determines that a value of read image density is abnormal in Step S8 and also in Step S10. This warning is conducted in Steps S19 and S20 in conjunction with the result from Step S8, and is conducted in Steps S22 and S23 in conjunction with the result from Step S10. This operation is arranged for a purpose of a security for protecting the color copying apparatus from unnecessary execution of a gamma table change.

Figure 7:
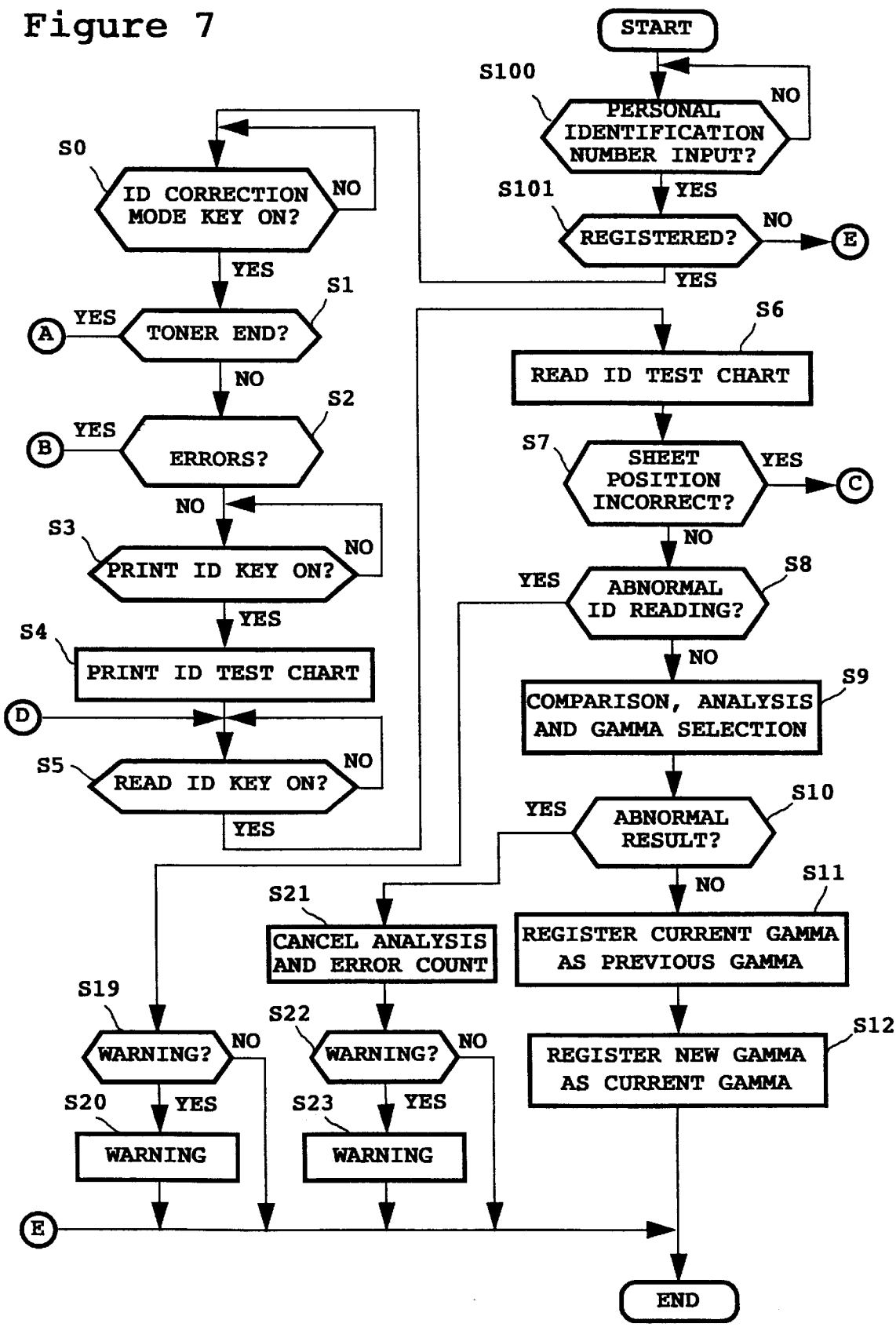
FIG. 7 is a flowchart explaining a process of how a gamma table is changed by the modified image signal processing circuit shown in FIG. 3.

Another security of a gamma table change provided to the color copying apparatus is explained with respect to FIG. 7. The flowchart in FIG. 7 is similar to that of FIG. 5, except Steps S100 and S101 are further included in FIG. 7. A user who may need to change a gamma table registers a PIN (personal identification number) through the operation panel 100. The PIN is then stored in the memory 30. When entrance of a PIN is detected in Step S100, the gamma correction controller 29, in Step S101, checks whether or not the PIN is identical to the registered PIN. When the PIN is not identical to the registered PIN, an answer of Step S101 becomes NO. The process then does not further proceed to execute a gamma table change. An unnecessary execution of a gamma table change can thus be avoided.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A color image forming apparatus, comprising:
   original document reading means for reading an image of an original document and for generating image signals respectively representing color elements representing said image of said original document;
   image signal processing means for processing said image signals output from said original document reading means and for separating said image signals into image signals for a letter image and image signals for a photo image;
   image recording means for converting said image signals into a visual form of a color image on a recording medium;
   interface means for receiving an instruction entered by an operator and for informing said operator of a state of said color image forming apparatus;
   storing means for storing data representing a reference image including a plurality of color gray scales, each color gray scale including a plurality of blocks, each block having an image density stepwise different from an image density of other blocks, for each color element for said letter image and said photo image, and for pre-storing, prior to the original document reading means reading the reference image, at least one data table for gamma data; and
   gamma selection control means for controlling said image recording means to record said reference image stored in said storing means on a recording medium upon receiving a recording instruction through said interface means, for controlling said original document reading means to read said reference image recorded on said recording medium, for detecting an input of a change instruction for changing said gamma data through said interface means, for changing said gamma data, and for analyzing a difference of image density of each of said color elements between said reference image stored in said storing means and said reference image recorded on said recording medium.

2. A color image forming apparatus according to claim 1, wherein said image signal processing means includes switch means for switching a source of an image signal between said original document reading means and an external apparatus upon receiving at least one of a switch instruction from said operator through said interface means and another switch instruction from said external apparatus.

3. A color image forming apparatus according to claim 2, wherein said storing means stores a plurality of personal identification numbers, and said gamma selection control means enables the instruction for changing the gamma data only when a personal identification number entered by an operator is verified by a personal identification number stored in said storing means.

4. A color image forming apparatus according to claim 1, wherein said storing means stores a plurality of personal identification numbers, and said gamma selection control means enables the instruction for changing the gamma data only when a personal identification number entered by an operator is verified by a personal identification number stored in said storing means.

5. A color image forming apparatus comprising:
   original document reading means for reading an image of an original document and for generating image signals respectively representing color elements representing said image of said original document;
   image signal processing means for processing said image signals output from said original document reading means and for separating said image signals into image signals for a letter image and image signals for a photo image;
   image recording means for converting said image signals into a visual form of a color image on a recording medium;
   interface means for receiving an instruction entered by an operator and for informing said operator of a state of said color image forming apparatus;
   storing means for storing data representing a reference image including a plurality of color gray scales, each color gray scale including a plurality of blocks, each block having an image density stepwise different from an image density of other blocks, for each color element for said letter image and said photo image, and for storing at least one data table for gamma data; and gamma selection control means for controlling said image recording means to record said reference image stored in said storing means on a recording medium upon receiving a recording instruction through said interface means, for controlling said original document reading means to read said reference image recorded on said recording medium, for detecting an input of a change instruction for changing said gamma data through said interface means, for changing said gamma data, and for analyzing a difference of image density of each of said color elements between said reference image stored in said storing means and said reference image recorded on said recording medium;

wherein said gamma selection control means determines that a value of image density includes an abnormal value upon detecting that said reference image recorded on said recording medium does not present a graded image density similar to said reference image stored in said storing means.

6. A color image forming apparatus according to claim 5, wherein said gamma selection control means generates a warning signal upon determining that a value of image density includes an abnormal value, and sends said warning signal to said interface means to provide an operator with a warning indicative of determination that the value of image density includes the abnormal value.

7. A color image forming apparatus according to claim 6, wherein said gamma selection control means selects at least one of a first condition in which said warning signal is sent to said interface means and a second condition in which said warning signal is not sent to said interface means, upon receiving a warning selection instruction from the operator through said interface means.

8. A color image forming apparatus according to claim 6, wherein said storing means stores a plurality of personal identification numbers, and said gamma selection control means enables the instruction for changing the gamma data only when a personal identification number entered by an operator is verified by a personal identification number stored in said storing means.

9. A color image forming apparatus according to claim 6, wherein said gamma selection control means determines that a value of image density includes an abnormal value upon detecting that any one of values of image density of said plurality of said blocks of said color gray scales of said reference image recorded on said recording medium exceeds a predetermined limit.

10. A color image forming apparatus according to claim 9, wherein said gamma selection control means generates a warning signal upon determining that a value of image density includes an abnormal value, and sends said warning signal to said interface means to provide an operator with a warning indicative of determination that the value of image density includes the abnormal value.

11. A color image forming apparatus according to claim 10, wherein said gamma selection control means selects at least one of a first condition in which said warning signal is sent to said interface means and a second condition in which said warning signal is not sent to said interface means, upon receiving a warning selection instruction from the operator through said interface means.

12. A color image forming apparatus according to claim 10, wherein said storing means stores a plurality of personal identification numbers, and said gamma selection control means enables the instruction for changing the gamma data only when a personal identification number entered by an operator is verified by a personal identification number stored in said storing means.

13. A color image forming apparatus according to claim 9, wherein said storing means stores a plurality of personal identification numbers, and said gamma selection control means enables the instruction for changing the gamma data only when a personal identification number entered by an operator is verified by a personal identification number stored in said storing means.

14. A color image forming apparatus according to claim 5, wherein said storing means stores a plurality of personal identification numbers, and said gamma selection control means enables the instruction for changing the gamma data only when a personal identification number entered by an operator is verified by a personal identification number stored in said storing means.

15. A color image forming apparatus according to claim 5, wherein said gamma selection control means determines that a value of image density includes an abnormal value upon detecting that any one of values of image density of said plurality of said blocks of said color gray scales of said reference image recorded on said recording medium exceeds a predetermined limit.

16. A color image forming apparatus according to claim 15, wherein said storing means stores a plurality of personal identification numbers, and said gamma selection control means enables the instruction for changing the gamma data only when a personal identification number entered by an operator is verified by a personal identification number stored in said storing means.

17. A color image forming apparatus according to claim 15, wherein said gamma selection control means generates a warning signal upon determining that a value of image density includes an abnormal value, and sends said warning signal to said interface means to provide an operator with a warning indicative of determination that the value of image density includes the abnormal value.

18. A color image forming apparatus according to claim 17, wherein said gamma selection control means selects at least one of a first condition in which warning signal is sent to said interface means and a second condition in which said warning signal is not sent to said interface means, upon receiving a warning selection instruction from the operator through said interface means.

19. A color image forming apparatus according to claim 17, wherein said storing means stores a plurality of personal identification numbers, and said gamma selection control means enables the instruction for changing the gamma data only when a personal identification number entered by an operator is verified by a personal identification number stored in said storing means.

20. A color image forming apparatus comprising:

original document reading means for reading an image of an original document and for generating image signals respectively representing color elements representing said image of said original document;

image signal processing means for processing said image signals output from said original document reading means and for separating said image signals into image signals for a letter image and image signals for a photo image;

image recording means for converting said image signals into a visual form of a color image on a recording medium;

interface means for receiving an instruction entered by an operator and for informing said operator of a state of said color image forming apparatus;

storing means for storing data representing a reference image including a plurality of color gray scales, each color gray scale including a plurality of blocks, each block having an image density stepwise different from an image density of other blocks, for each color element for said letter image and said photo image, and for storing at least one data table for gamma data; and gamma selection control means for controlling said image recording means to record said reference image stored in said storing means on a recording medium upon receiving a recording instruction through said interface means, for controlling said original document reading means to read said reference image recorded on said recording medium, for detecting an input of a change instruction for changing said gamma data through said interface means, for changing said gamma data, and for analyzing a difference of image density of each of said color elements between said reference image stored in said storing means and said reference image recorded on said recording medium;

wherein said image signal processing means includes switch means for switching a source of an image signal between said original document reading means and an external apparatus upon receiving at least one of a switch instruction from said operator through said interface means and another switch instruction from said external apparatus;

wherein said gamma selection control means determines that a value of image density includes an abnormal value upon detecting that said reference image recorded on said recording medium does not a present graded image density similar to said reference image stored in said storing means.

21. A color image forming apparatus according to claim 20, wherein said gamma selection control means generates a warning signal upon determining that a value of image density includes an abnormal value, and sends said warning signal to said interface means to provide an operator with a warning indicative of determination that the value of image density includes the abnormal value.

22. A color image forming apparatus according to claim 21, wherein said storing means stores a plurality of personal identification numbers, and said gamma selection control means enables the instruction for changing the gamma data only when a personal identification number entered by an operator is verified by a personal identification number stored in said storing means.

23. A color image forming apparatus according to claim 21, wherein said gamma selection control means selects at least one of a first condition in which said warning signal is sent to said interface means and a second condition in which said warning signal is not sent to said interface means, upon receiving a warning selection instruction from the operator through said interface means.

24. A color image forming apparatus according to claim 21, wherein said gamma selection control means determines that a value of image density includes an abnormal value upon detecting that any one of values of image density of said plurality of said blocks of said color gray scales of said reference image recorded on said recording medium exceeds a predetermined limit.

25. A color image forming apparatus according to claim 14, wherein said gamma selection control means generates a warning signal upon determining that a value of image density includes an abnormal value, and sends said warning signal to said interface means to provide an operator with a warning indicative of determination that the value of image density includes the abnormal value.

26. A color image forming apparatus according to claim 25, wherein said gamma selection control means selects at least one of a first condition in which said warning signal is sent to said interface means and a second condition in which said warning signal is not sent to said interface means, upon receiving a warning selection instruction from the operator through said interface means.

27. A color image forming apparatus according to claim 25, wherein said storing means stores a plurality of personal identification numbers, and said gamma selection control means enables the instruction for changing the gamma data only when a personal identification number entered by an operator is verified by a personal identification number stored in said storing means.

28. A color image forming apparatus according to claim 24, wherein said storing means stores a plurality of personal identification numbers, and said gamma selection control means enables the instruction for changing the gamma data only when a personal identification number entered by an operator is verified by a personal identification number stored in said storing means.

29. A color image forming apparatus according to claim 20, wherein said gamma selection control means determines that a value of image density includes an abnormal value upon detecting that any one of values of image density of said plurality of said blocks of said color gray scales of said reference image recorded on said recording medium exceeds a predetermined limit.

30. A color image forming apparatus according to claim 29, wherein said gamma selection control means generates a warning signal upon determining that a value of image density includes an abnormal value, and sends said warning signal to said interface means to provide an operator with a warning indicative of determination that the value of image density includes the abnormal value.

31. A color image forming apparatus according to claim 30, wherein said gamma selection control means selects at least one of a first condition in which said warning signal is sent to said interface means and a second condition in which said warning signal is not sent to said interface means, upon receiving a warning selection instruction from the operator through said interface means.

32. A color image forming apparatus according to claim 30, wherein said storing means stores a plurality of personal identification numbers, and said gamma selection control means enables the instruction for changing the gamma data only when a personal identification number entered by an operator is verified by a personal identification number stored in said storing means.

33. A color image forming apparatus according to claim 29, wherein said storing means stores a plurality of personal identification numbers, and said gamma selection control means enables the instruction for changing the gamma data only when a personal identification number entered by an operator is verified by a personal identification number stored in said storing means.

34. A color image forming apparatus according to claim 20, wherein said storing means stores a plurality of personal identification numbers, and said gamma selection control means enables the instruction for changing the gamma data only when a personal identification number entered by an operator is verified by a personal identification number stored in said storing means.

35. A color image forming apparatus comprising;

original document reading means for reading an image of an original document and for generating image signals respectively representing color elements representing said image of said original document;

image signal processing means for processing said image signals output from said original document reading means and for separating said image signals into image signals for a letter image and image signals for a photo image;

image recording means for converting said image signals into a visual form of a color image on a recording medium;

interface means for receiving an instruction entered by an operator and for informing said operator of a state of said color image forming apparatus;

storing means for storing data representing a reference image including a plurality of color gray scales, each color gray scale including a plurality of blocks, each block having an image density stepwise different from an image density of other blocks, for each color element for said letter image and said photo image, and for storing at least one data table for gamma data; and gamma selection control means for controlling said image recording means to record said reference image stored in said storing means on a recording medium upon receiving a recording instruction through said interface means, for controlling said original document reading means to read said reference image recorded on said recording medium, for detecting an input of a change instruction for changing said gamma data through said interface means, for changing said gamma data, and for analyzing a difference of image density of each of said color elements between said reference image stored in said storing means and said reference image recorded on said recording medium;

wherein said gamma selection control means determines that a value of image density includes an abnormal value upon detecting that any one of values of image density of said plurality of said blocks of said color gray scales of said reference image recorded on said recording medium exceeds a predetermined limit.

36. A color image forming apparatus according to claim 35, wherein said storing means stores a plurality of personal identification numbers, and said gamma selection control means enables the instruction for changing the gamma data only when a personal identification number entered by an operator is verified by a personal identification number stored in said storing means.

37. A color image forming apparatus according to claim 35, wherein said gamma selection control means generates a warning signal upon determining that a value of image density includes an abnormal value, and sends said warning signal to said interface means to provide an operator with a warning indicative of determination that the value of image density includes the abnormal value.

38. A color image forming apparatus according to claim 15, wherein said gamma selection control means selects at least one of a first condition in which said warning signal is sent to said interface means and a second condition in which said warning signal is not sent to said interface means, upon receiving a warning selection instruction from the operator through said interface means.

39. A color image forming apparatus according to claim 37, wherein said storing means stores a plurality of personal identification numbers, and said gamma selection control means enables the instruction for changing the gamma data only when a personal identification number entered by an operator is verified by a personal identification number stored in said storing means.

40. A color image forming apparatus comprising:

original document reading means for reading an image of an original document and for generating image signals respectively representing color elements representing said image of said original document;

image signal processing means for processing said image signals output from said original document reading means and for separating said image signals into image signals for a letter image and image signals for a photo image;

image recording means for converting said image signals into a visual form of a color image on a recording medium;

interface means for receiving an instruction entered by an operator and for informing said operator of a state of said color image forming apparatus;

storing means for storing data representing a reference image including a plurality of color gray scales, each color gray scale including a plurality of blocks, each block having an image density stepwise different from an image density of other blocks, for each color element for said letter image and said photo image, and for storing at least one data table for gamma data; and gamma selection control means for controlling said image recording means to record said reference image stored in said storing means on a recording medium upon receiving a recording instruction through said interface means, for controlling said original document reading means to read said reference image recorded on said recording medium, for detecting an input of a change instruction for changing said gamma data through said interface means, for changing said gamma data, and for analyzing a difference of image density of each of said color elements between said reference image stored in said storing means and said reference image recorded on said recording medium;

wherein said image signal processing means includes switch means for switching a source of an image signal between said original document reading means and an external apparatus upon receiving at least one of a switch instruction from said operator through said interface means and another switch instruction from said external apparatus;

wherein said gamma selection control means determines that a value of image density includes an abnormal value upon detecting that any one of values of image density of said plurality of said blocks of said color gray scales of said reference image recorded on said recording medium exceeds a predetermined limit.

41. A color image forming apparatus according to claim 40, wherein said gamma selection control means generates a warning signal upon determining that a value of image density includes an abnormal value, and sends said warning signal to said interface means to provide an operator with a warning indicative of determination that the value of image density includes the abnormal value.

42. A color image forming apparatus according to claim 16, wherein said gamma selection control means selects at least one of a first condition in which said warning signal is sent to said interface means and a second condition in which said warning signal is not sent to said interface means, upon receiving a warning selection instruction from the operator through said interface means.

43. A color image forming apparatus according to claim 41, wherein said storing means stores a plurality of personal identification numbers, and said gamma selection control means enables the instruction for changing the gamma data only when a personal identification number entered by an operator is verified by a personal identification number stored in said storing means.

44. A color image forming apparatus according to claim 40, wherein said storing means stores a plurality of personal identification numbers, and said gamma selection control means enables the instruction for changing the gamma data only when a personal identification number entered by an operator is verified by a personal identification number stored in said storing means.

45. A color image forming apparatus, comprising:

original document reading means for reading an image of an original document;

image recording means for converting said read image of the original document into a visual form of a color image on a recording medium;

interface means for receiving an instruction entered by an operator and for informing said operator of a state of said color image forming apparatus;

storing means for pre-storing, prior to the original document reading means reading the image of the original document, data representing a reference image and for pre-storing, prior to the original document reading means reading the reference image, at least one data table for gamma data; and gamma selection control means for controlling said image recording means to record said reference image stored in said storing means on a recording medium upon receiving a recording instruction through said interface means, for controlling said original document reading means to read said reference image recorded on said recording medium, for detecting an input of a change instruction for changing said gamma data through said interface means, for changing said gamma data, and for analyzing a difference of image density between said reference image stored in said storing means and said reference image recorded on said recording medium.

46. A color image forming apparatus comprising:

original document reading means for reading an image of an original document;

image recording means for converting said read image of the original document into a visual form of a color image on a recording medium;

interface means for receiving an instruction entered by an operator and for informing said operator of a state of said color image forming apparatus;

storing means for storing data representing a reference image and for pre-storing, prior to the original document reading means reading the reference image, at least one data table for gamma data;

gamma selection control means for controlling said image recording means to record said reference image stored in said storing means on a recording medium upon receiving a recording instruction through said interface means, for controlling said original document reading means to read said reference image recorded on said recording medium, for detecting an input of a change instruction for changing said gamma data through said interface means, for changing said gamma data, and for analyzing a difference of image density between said reference image stored in said storing means and said reference image recorded on said recording medium, and switch means for switching a source of an image signal between said original document reading means and an external apparatus upon receiving at least one of a switch instruction from said operator through said interface means and another switch instruction from said external apparatus.

47. A color image forming apparatus comprising:

original document reading means for reading an image of an original document;

image recording means for converting said read image of the original document into a visual form of a color image on a recording medium;

interface means for receiving an instruction entered by an operator and for informing said operator of a state of said color image forming apparatus;

storing means for storing data representing a reference image and for storing at least one data table for gamma data; and gamma selection control means for controlling said image recording means to record said reference image stored in said storing means on a recording medium upon receiving a recording instruction through said interface means, for controlling said original document reading means to read said reference image recorded on said recording medium, for detecting an input of a change instruction for changing said gamma data through said interface means, for changing said gamma data, and for analyzing a difference of image density between said reference image stored in said storing means and said reference image recorded on said recording medium.

48. A color image forming apparatus comprising:

original document reading means for reading an image of an original document;

image recording means for converting said read image of the original document into a visual form of a color image on a recording medium;

interface means for receiving an instruction entered by an operator and for informing said operator of a state of said color image forming apparatus;

storing means for storing data representing a reference image and for storing at least one data table for gamma data; and gamma selection control means for controlling said image recording means to record said reference image stored in said storing means on a recording medium upon receiving a recording instruction through said interface means, for controlling said original document reading means to read said reference image recorded on said recording medium, for detecting an input of a change instruction for changing the gamma data through said interface means, for changing said gamma data, and for analyzing a difference of image density between said reference image stored in said storing means and said reference image recorded on said recording medium, wherein said gamma selection control means generates a warning signal upon determining that a value of image density includes an abnormal value, and sends said warning signal to said interface means to provide an operator with a warning indicative of determination that the value of image density includes the abnormal value.

49. A color image forming apparatus comprising:

original document reading means for reading an image of an original document;

image recording means for converting said read image of the original document into a visual form of a color image on a recording medium;

interface means for receiving an instruction entered by an operator and for informing said operator of a state of said color image forming apparatus;

storing means for storing data representing a reference image and for storing at least one data table for gamma data; and gamma selection control means for controlling said image recording means to record said reference image stored in said storing means on a recording medium upon receiving a recording instruction through said interface means, for controlling said original document reading means to read said reference image recorded on said recording medium, for detecting an input of a change instruction for changing said gamma data through said interface means, for changing said gamma data and for analyzing a difference of image density between said reference image stored in said storing means and said reference image recorded on said recording medium, wherein said gamma selection control means selects at least one of a first condition in which a warning signal is sent to said interface means and a second condition in which said warning signal is not sent to said interface means, upon receiving a warning selection instruction from the operator through said interface means.

50. A color image forming apparatus comprising:

original document reading means for reading an image of an original document;

image recording means for converting said read image of the original document into a visual form of a color image on a recording medium;

interface means for receiving an instruction entered by an operator and for informing said operator of a state of said color image forming apparatus;

storing means for storing data representing a reference image and for pre-storing, prior to the original document reading means reading the reference image, at least one data table for gamma data; and gamma selection control means for controlling said image recording means to record said reference image stored in said storing means on a recording medium upon receiving a recording instruction through said interface means, for controlling said original document reading means to read said reference image recorded on said recording medium, for detecting an input of a change instruction for changing said gamma data through said interface means, for changing said gamma data, and for analyzing a difference of image density between said reference image stored in said storing means and said reference image recorded on said recording medium, wherein said storing means stores a plurality of personal identification numbers, and said gamma selection control means enables the instruction for changing the gamma data only when a personal identification number entered by an operator is verified by a personal identification number stored in said storing means.

* * * * *